(12) United States Patent
Wiegand et al.

(10) Patent No.: US 11,188,533 B1
(45) Date of Patent: *Nov. 30, 2021

(54) GENERATING QUERY ANSWERS FROM A USER'S HISTORY

(71) Applicant: Google LLC, Mountain View, CA (US)

(72) Inventors: Nathan Wiegand, San Jose, CA (US); Bryan C. Horling, Sunnyvale, CA (US); Jason L. Smart, Alamo, CA (US)

(73) Assignee: GOOGLE LLC, Mountain View, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/681,670

(22) Filed: Nov. 12, 2019

Related U.S. Application Data

(63) Continuation of application No. 15/421,005, filed on Jan. 31, 2017, now Pat. No. 10,515,076, which is a continuation of application No. 13/898,879, filed on May 21, 2013, now abandoned.

(60) Provisional application No. 61/811,252, filed on Apr. 12, 2013.

(51) Int. Cl.
    *G06F 16/00* (2019.01)
    *G06F 16/2453* (2019.01)
    *G06F 16/242* (2019.01)

(52) U.S. Cl.
    CPC ...... *G06F 16/24539* (2019.01); *G06F 16/243* (2019.01)

(58) Field of Classification Search
    CPC .................... G06F 16/24539; G06F 16/243

USPC .......................................................... 707/768
See application file for complete search history.

(56) References Cited

U.S. PATENT DOCUMENTS

| | | |
|---|---|---|
| 5,418,948 A | 5/1995 | Turtle |
| 6,233,547 B1 | 5/2001 | Denber |
| 6,430,531 B1 | 8/2002 | Polish |
| 7,702,508 B2 | 4/2010 | Bennett |
| 7,730,054 B1 | 6/2010 | Masuaros et al. |
| 8,095,876 B1 | 1/2012 | Verstak et al. |
| 8,312,042 B2 | 11/2012 | LeBeau et al. |
| 8,527,279 B2 | 9/2013 | Singleton et al. |
| 8,874,586 B1 | 10/2014 | Sommers et al. |
| 8,977,953 B1 | 3/2015 | Pierre et al. |
| 10,515,076 B1 * | 12/2019 | Wiegand ............... G06F 16/243 |
| 2004/0243417 A9 | 12/2004 | Pitts, III |

(Continued)

OTHER PUBLICATIONS

Davis, Harold, "Google Has a New Search History Tool," O'Reilly ONLamp.com, Apr. 21, 2005, downloaded from the internet on May 16, 2013, http://www.oreillynet.com/onlamp/blog/2005/Q4/google_has_a_new_search_histor.html, 2 pages.

*Primary Examiner* — Thanh-Ha Dang
(74) *Attorney, Agent, or Firm* — Middleton Reutlinger

(57) ABSTRACT

One or more servers receive a natural language query from a client device associated with a user. The one or more servers classify the natural language query as a query that seeks information previously accessed by the user. The one or more servers then obtain a response to the natural language query from one or more collections of documents, wherein each document in the one or more collections of documents was previously accessed by the user. The one or more servers generate search results based on the response. Then, the one or more servers communicate the search results to the client device.

18 Claims, 5 Drawing Sheets

(56) References Cited

U.S. PATENT DOCUMENTS

| | | |
|---|---|---|
| 2005/0149504 A1 | 7/2005 | Ratnaparkhi |
| 2006/0200455 A1 | 9/2006 | Wilson |
| 2006/0224570 A1* | 10/2006 | Quiroga .............. G06F 16/3329 |
| 2006/0235886 A1 | 10/2006 | Norman |
| 2007/0005570 A1 | 1/2007 | Hurst-Hiller |
| 2007/0061332 A1 | 3/2007 | Ramer |
| 2007/0174237 A1* | 7/2007 | Wilbrink ............. G06F 16/9574 |
| 2007/0174273 A1* | 7/2007 | Jones .................... G06F 16/951 |
| 2007/0219781 A1 | 9/2007 | Roche et al. |
| 2008/0133811 A1 | 6/2008 | Lu |
| 2008/0172647 A1 | 7/2008 | Roche et al. |
| 2008/0183680 A1 | 7/2008 | Meynier et al. |
| 2008/0195582 A1* | 8/2008 | Yu ......................... G06F 3/0237 |
| 2009/0182726 A1 | 7/2009 | Wang |
| 2009/0228281 A1 | 9/2009 | Singleton et al. |
| 2011/0208524 A1 | 8/2011 | Haughay |
| 2011/0231411 A1 | 9/2011 | Shein et al. |
| 2012/0016678 A1 | 1/2012 | Gruber |
| 2012/0076414 A1 | 3/2012 | Xu et al. |
| 2012/0191531 A1 | 7/2012 | You et al. |
| 2013/0018867 A1 | 1/2013 | Regan |
| 2013/0275164 A1 | 10/2013 | Gruber |
| 2013/0283168 A1 | 10/2013 | Brown |
| 2013/0346068 A1* | 12/2013 | Solem .................... G10L 15/26 704/9 |
| 2014/0122059 A1 | 5/2014 | Patel |
| 2014/0163978 A1 | 6/2014 | Basye |
| 2014/0236986 A1 | 8/2014 | Guzman |
| 2017/0337265 A1 | 11/2017 | Garrett |

* cited by examiner

US 11,188,533 B1

GENERATING QUERY ANSWERS FROM A USER'S HISTORY

CROSS-REFERENCE TO RELATED APPLICATION

This application is a continuation of U.S. patent application Ser. No. 15/421,005, filed on Jan. 31, 2017, which is a continuation of U.S. patent application Ser. No. 13/898,879, filed on May 21, 2013, which claims the benefit of U.S. Patent Application Ser. No. 61/811,252, filed on Apr. 12, 2013, the contents of each are incorporated herein by reference in their entirety

TECHNICAL FIELD

This specification generally relates to generating answers to queries by accessing a user's history.

BACKGROUND

Search systems may generate responses to queries by providing search results from a database. Some search systems may also store a search history for a given user. However, conventional search systems may lack the ability to allow users to locate information that they have previously accessed using a natural language query.

SUMMARY

When a user seeks information that the user has previously accessed, for example via voice to a dialog system, it may be desirable to permit the user to formulate the query using natural language. Such natural language queries may provide a natural, easy way for users to retrieve information they have previously seen. Thus, according to one general aspect of the subject matter described in this specification, in response to a natural language query, a search system obtains search results from information previously accessed by a user.

One aspect of the subject matter described in this specification may be embodied in methods that include the actions of receiving, at one or more servers, a natural language query from a client device associated with a user. The actions also include classifying, at the one or more servers, the natural language query as a query that seeks information previously accessed by the user. Then, the actions include obtaining, at the one or more servers, a response to the natural language query from one or more collections of documents, wherein each document in the one or more collections of documents was previously accessed by the user. Further actions include generating, at the one or more servers, search results based on the response, and communicating, from the one or more servers, the search results to the client device.

In some implementations, the natural language query may be audio speech data encoding a natural language query from a client device associated with a user.

In some implementations, classifying the natural language query as a query that seeks information previously accessed by the user may include the actions of comparing one or more portions of the natural language query to one or more phrases, the one or more phrases being identified as seeking previously accessed information; and based on the comparison, determining that the natural language query seeks information previously accessed by the user.

Some implementations involve obtaining a response to the natural language query from a browser history of the user and/or an email account of the user.

In some implementations, the actions include determining, at the server, one or more filters based on the natural language query. In such implementations, the documents obtained in response to the natural language query may satisfy the one or more filters. For example, the one or more filters may include a filter identifying a user device that was previously used to access information based on the natural language query. In this case, each document in the set of documents obtained in response to the natural language query may have been previously accessed from the identified user device. Other filters may include: (i) a topic; (ii) a date and/or time; (iii) a source; (iv) a device of the user; (v) a sender of the information; and/or (vi) a location where the information was accessed.

In some implementations, one or more documents in the set of documents satisfying the one or more filters may be a version of the respective document that was previously accessed by the user. In such implementations, the search results may identify the one or more versions of the documents that were previously accessed by the user.

Other embodiments of these aspects include corresponding systems, apparatus, and computer programs, configured to perform the actions of the methods, encoded on non-transitory computer-readable storage media.

Implementations described in this specification may realize one or more of the following advantages. In some implementations, the system allows users to retrieve previously accessed information in a natural and easy manner.

The details of the subject matter described in this specification are set forth in the accompanying drawings and the description below. Other features, aspects, and advantages of the subject matter will become apparent from the description, the drawings, and the claims.

DETAILED DESCRIPTION

When a user asks a question, a search system may provide an answer by accessing a database. In some instances, a search system may allow a user to formulate a query as a natural language query, e.g., "I'm looking for the chess story that I read last week". Upon receiving a natural language query, the search system may determine that the likely intent of the query is to seek information, e.g., a web page, email, document, image, or video, which was previously accessed by the user. The search system may also identify various filters from the query. For example, the filters may include: (i) a topic (e.g., "turkey recipes"); (ii) a date and/or time (e.g., "last week"); (iii) a source (e.g., "WhiteHouse.gov"); (iv) a device of the user (e.g., mobile device, desktop, or tablet); (v) a sender of the information (e.g., "from grandma"); and/or (vi) a location where the information was accessed (e.g., "at home," "at work").

After classifying the query as a history-seeking query and, optionally, identifying any filters from the query, the search system searches collections of documents that were previously accessed by the user to generate a response to the query. For example, the search system may search the user's browser history or email account. In some implementations, users may be provided with an option to use features that collect information on documents that were previously accessed by the user. In addition, certain data may be anonymized in one or more ways before it is stored or used, so that personally identifiable information is removed. For example, a user's identity may be anonymized. Once responsive documents have been retrieved from the appropriate collections, the search system can rank the documents and communicate the ranked search results back to the user.

Figure 1:
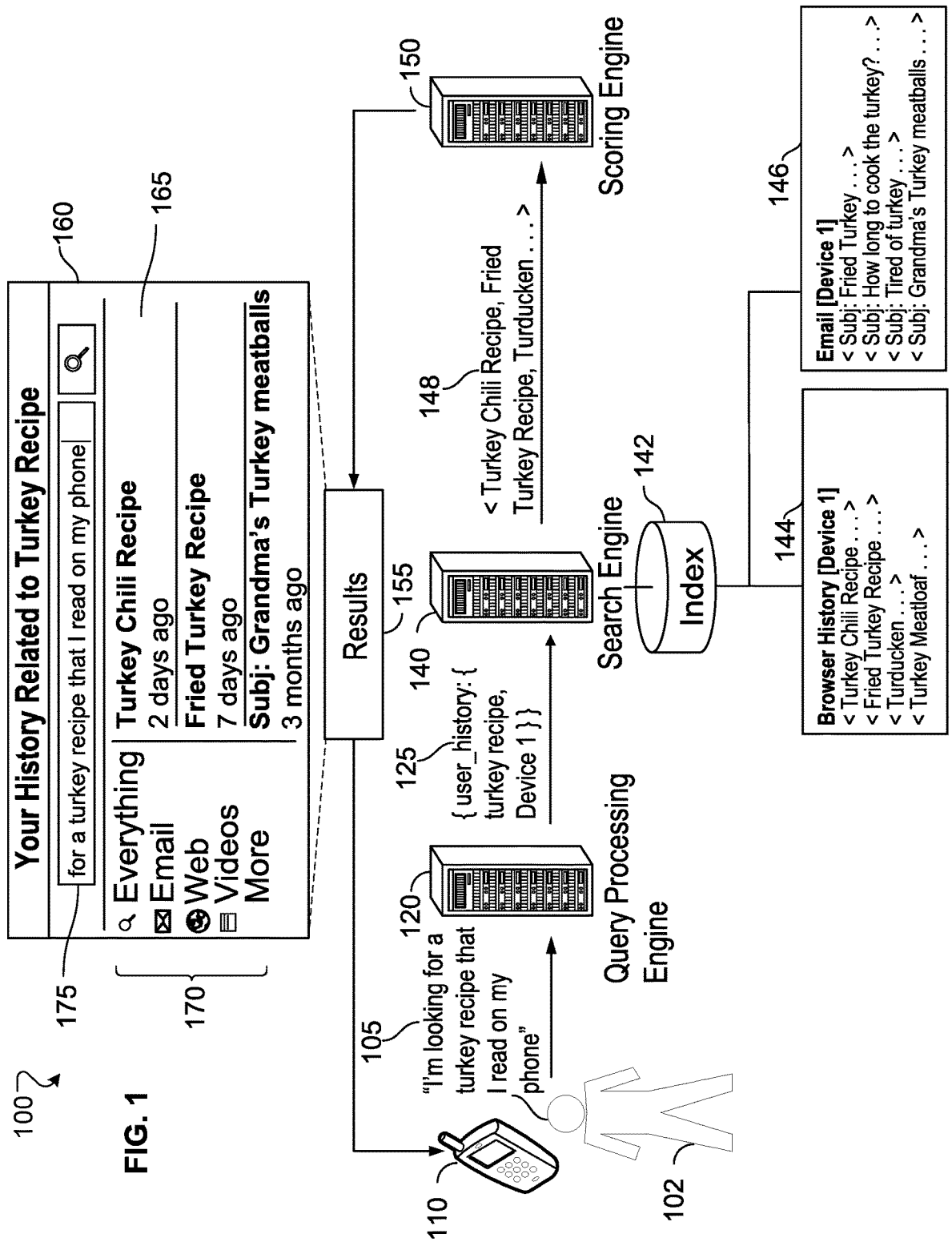
FIG. 1 is a diagram of an example system that generates search results based on information previously accessed by a user.

FIG. 1 shows an example system 100 that generates search results based on information previously accessed by a user. The system 100 includes a client device 110, a query processing engine 120, a search engine 140, and a scoring engine 150. Query processing engine 120, search engine 140, and scoring engine 150 may be computing devices that take the form of a number of different devices, for example a standard server, a group of such servers, or a rack server system. In addition, query processing engine 120, search engine 140, and scoring engine 150 may be implemented in a personal computer, for example a laptop computer.

As shown in FIG. 1, a user 102 initiates a query 105 using the client device 110. The user 102 may format the query 105 as a natural language question. The client device 110 may include one or more processing devices, and may be, or include, a mobile telephone (e.g., a smartphone), a laptop computer, a handheld computer, a tablet computer, a network appliance, a camera, a media player, a wearable computer, a navigation device, an email device, a game console, an interactive television, or a combination of any two or more of these data processing devices or other data processing devices.

In some implementations, the user 102 may interact with the client device 110 using a voice-based dialog system. For example, the user 102 may say "I'm looking for a turkey recipe that I read about on my phone" into a microphone of the client device 110. The client device 110 may then perform speech recognition to convert the utterance into a transcription, and then transmit the transcription to the query processing engine 120. Alternatively, the client device 110 may transmit audio speech data encoding the utterance.

The query processing engine 120 receives the query 105 from the client device 110. If the query 105 is encoded as audio speech data, the query processing engine 120 may convert the audio speech data into a transcription. As described in more detail with reference to FIG. 3 below, the query processing engine 120 then translates the original query into a format suitable for querying a database. For example, the query processing engine 120 may convert the question "I'm looking for a turkey recipe that I read about on my phone" into a formatted query 125, which is identified as a history seeking question, (e.g., designated by "user_history") that includes a topic filter (e.g., "turkey recipe") and a device filter (e.g., "Device 1"). The resulting formatted query 125 may be, for example, "{user history: {turkey recipe, Device 1}}". The query processing engine 120 may include a natural language processing (NLP) engine as described below. An NLP engine receives a question in a natural language of a user and then parses and translates the question into a query expression language (e.g., structured query language (SQL) or Google query language (GQL)). The natural language may be, for example, English, Spanish, French, Japanese, Mandarin, or any other human language. The query processing engine 120 then sends the formatted query 125 to the search engine 140.

The search engine 140 receives the formatted query 125 and obtains documents responsive to the query based on any included filters. Due to the imperfect nature of human memory, it may be advantageous to apply imprecise, fuzzy searches that seek information previously accessed by a user. In some implementations, the search engine 240 may therefore apply aggressive synonyms, entities, or fuzzy time ranges to expand the filters. In particular, the search engine 140 may apply synonyms more aggressively than in a typical search because the corpus of documents is limited to documents that were previously accessed by the user 102.

The search engine 140 may include one or more processors, an operating system and one or more computer memories. The search engine 140 may include modules, stored in memory or an external storage device and loaded into memory that enable the search engine 140 to receive and respond to queries. The search engine 140 may be responsible for routing the query to search the index 142 and, in some implementations, other data sources, such as a corpus of documents from the Internet or an Intranet, in response to a query. For example, the search engine 140 may receive a query from a client, such as query processing engine 120, and send the query to an index cluster that accesses index 142 and to other indexing clusters that store indexes for searching other sources. In such an implementation, search engine 140 may have a module that compiles the results from all sources. In some implementations, search engine 140 may only send queries to an index cluster.

The index 142 may reference one or more collections of documents. For example, the index 142 may access a browser history collection 144 and an email collection 146. Each of these collections may include documents that were previously accessed by a given user (e.g., user 102). For example, the browser history collection 144 may include a list of web pages that were accessed by the user 102, and the email collection 146 may include emails that were accessed by the user 102. The search engine 140 may obtain documents from the index 142 based on the filters from the formatted query 125. For example, if the formatted query 125 includes a device filter (e.g., "Device 1") and a topic filter (e.g., "turkey recipe"), the search engine 140 may retrieve only documents from the collections 144, 146 that satisfy these filters, i.e., documents that the user 102 accessed on his client device 110 that relate to a "turkey recipe." Once the search engine 140 obtains documents in response to a query, it provides the documents to the scoring engine 150.

The scoring engine 150 ranks the documents 148 from the search engine 140 and returns search results 155 to the client device 110. The scoring engine 150 may include one or more processors, an operating system and one or more computer memories. The scoring engine 150 may include modules, stored in memory or an external storage device and loaded into memory that enable the search engine 150 to receive and rank documents.

As shown in FIG. 1, the results 155 may be included in a search results page 160 that includes the search results 165. In the example, the search results include a "Turkey Chili Recipe" web page that the user 102 accessed 2 days ago, a "Fried Turkey Recipe" web page that the user 102 accessed 7 days ago, and a "Grandma's Turkey meatballs" email that the user 102 accessed 3 months ago. The search results page 160 includes a set of icons 170 that may allow the user to filter the search results, for example, to emails, web pages, video, etc., and a search box 175 showing the original search query, i.e., "I'm looking for a turkey recipe that I read on my phone."

The search results page 160 may be rendered by the client device 110. While shown in FIG. 1 as being provided in search results 160, the search results could alternatively be transmitted as a transcription that allows the client device 110 to generate speech, or as an audio signal encoding the results for rendering at the client device.

Figure 2:
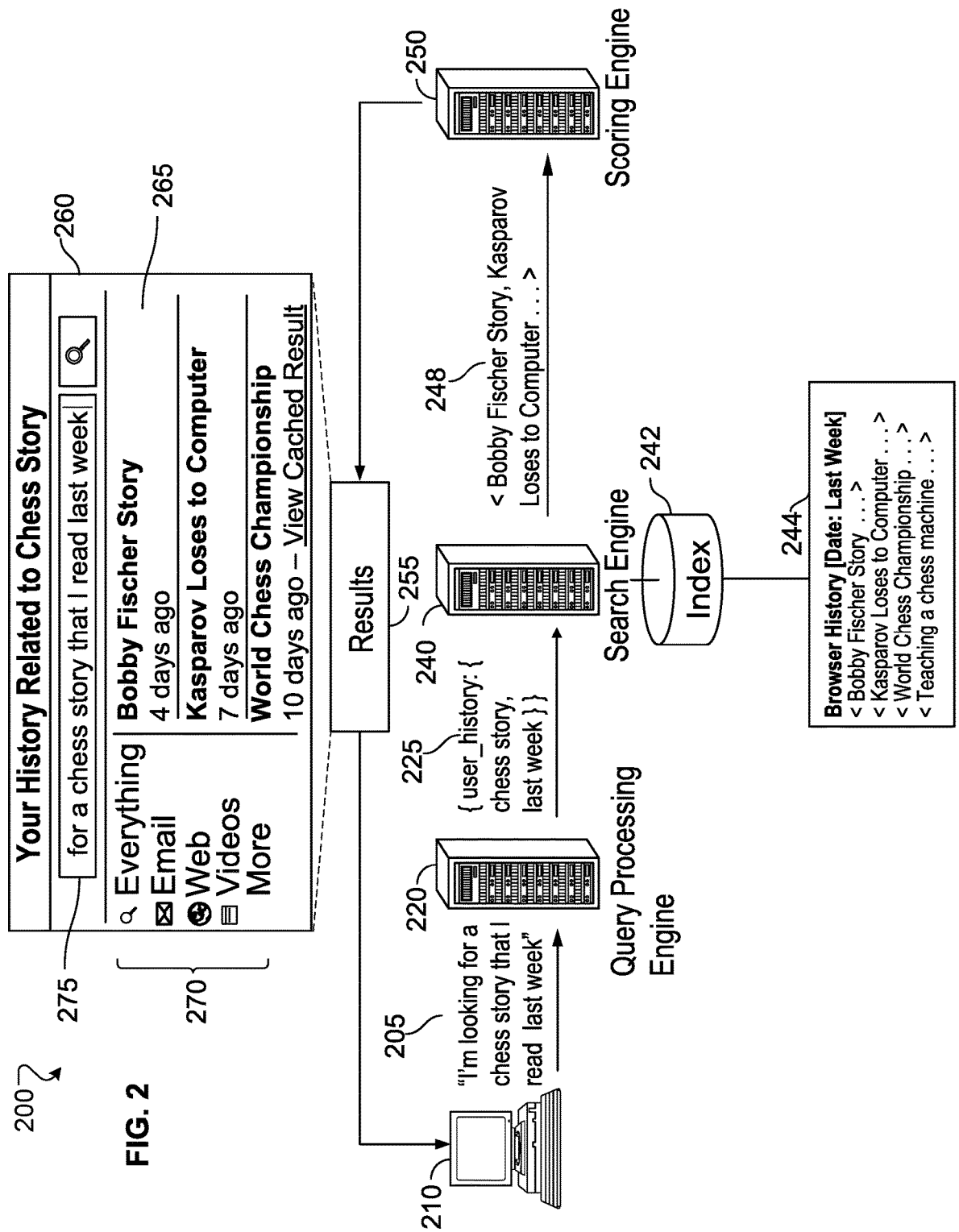
FIG. 2 is another diagram of an example system that generates search results based on information previously accessed by a user.

FIG. 2 shows another example system 200 that generates search results based on information previously accessed by a user. The system 200 includes a client device 210, a query processing engine 220, a search engine 240, and a scoring engine 250.

As shown in FIG. 2, a client device 210 initiates a query 205 that may be formatted as a natural language question. For example, a user may enter the query "I'm looking for a chess story that I read last week" into a web browser at the client device 210. In some implementations, the user may interact with the client device 210 using a voice-based dialog system.

The query processing engine 220 receives the query 205 from the client device 210. If the query 205 is encoded as audio speech data, the query processing engine 220 may transcribe the audio speech data. As described in more detail with reference to FIG. 3 below, the query processing engine 220 then translates the original query into a format suitable for querying a database. For example, the query processing engine 220 may convert the question, "I'm looking for a chess story that I read last week," into a formatted query 225, which is identified as a history seeking question that includes a topic filter (e.g., "chess story") and a date filter (e.g., "last week"). The resulting formatted query 225 may be, for example, "{user history: {chess story, last week}}". The query processing engine 220 then sends the formatted query 225 to the search engine 240.

The search engine 240 receives the formatted query 225 and obtains documents responsive to the query using the index 242 as described above. The index 242 may reference one or more collections of documents. For example, the index 242 may access a browser history collection 244. This collection may include documents that were previously accessed by a given user, e.g., the user of client device 210. For example, the browser history collection 244 may include a list of web pages that were accessed by the user. The search engine 240 may obtain documents from the index 242 based on the filters from the formatted query 225. For example, if the formatted query 225 includes a date filter (e.g., "last week") and a topic filter (e.g., "chess story"), the search engine 240 may retrieve only documents from the collection 244 that satisfy these filters, i.e., documents that the user accessed in the previous week that relate to a "chess story." In this example, the search engine 240 may apply fuzzy time ranges to the "last week" filter to account for inaccuracies in human memory. In particular, while "last week" literally refers to the seven calendar days of the previous week, the search engine 240 may search for documents over a wider range, e.g., anytime in the past two weeks.

Once the search engine 240 obtains documents in response to a query, it provides the documents to the scoring engine 250. The scoring engine 250 ranks the documents 248 from the search engine 240 and returns search results 255 to the client device 210. As shown in FIG. 2, the results 255 may be included in a search results page 260 that includes the search results 265. In the example, the search results include a "Bobby Fischer Story" web page that the user accessed 4 days ago, a "Kasparov Loses to Computer" web page that the user accessed 7 days ago, and a "World Chess Championship" web page that the user accessed 10 days ago.

As illustrated in FIG. 2, in addition to providing a link to the current version of a web page, the search results may provide access to a web page as it appeared when it was viewed by the user. For example, the search result "World Chess Championship" includes a "View Cached Result" link. This link may direct the client device 210 to a version of the "World Chess Championship" web page that was cached on or about 10 days ago. In some implementations, the cached version of the web page may be stored in association with a user's browser history. For example, when a user views a web page, the viewed page may be stored and linked to the user's browser history. This link could then be provided in the search results. Alternatively or in addition, a search system may periodically store versions of web pages, and a link to the stored version of the web page nearest in time to the last access date of the user could be provided.

The search results page 260 includes a set of icons 270 that may allow the user to filter the search results, for example, to emails, web pages, video, etc., and a search box 275 showing the original search query, i.e., "I'm looking for a chess story that I read last week." The search results page 260 may be rendered by the client device 210. While shown in FIG. 2 as being provided in search results 260, the search results could alternatively be transmitted as a transcription that allows the client device 210 to generate speech, or as an audio signal encoding the results for rendering at the client device.

Figure 3:
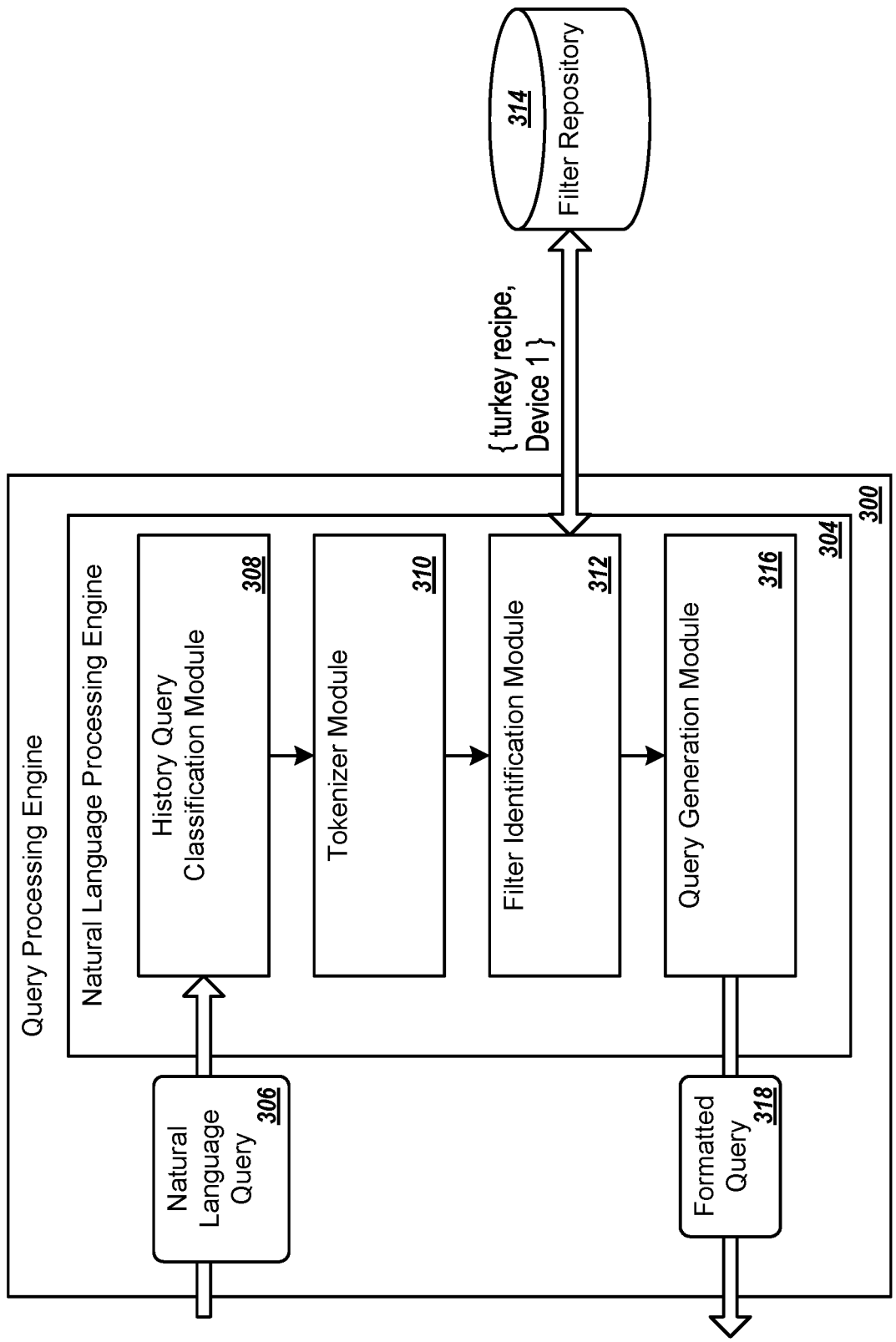
FIG. 3 is a diagram of an example query processing engine.

FIG. 3 shows an example query processing engine 300. Query processing engine 300 may correspond to, for instance, some or all of the functional components of query processing engine 120, 220 shown in FIGS. 1 and 2. Query processing engine 300 may include an NLP engine 304, which comprises a history query classification module 308, a tokenizer module 310, a filter identification module 312, and a query generation module 316. Any, or all, of modules 308, 310, 312, and 316 may be implemented by one or more memory devices and/or one or more processors. Furthermore, multiple modules may be associated with the same memory device and/or processor.

History query classification module 308 may receive a question from, for example, a user device—e.g., client device 110, 210—and may classify the question as a history seeking question. In other words, history query classification module 308 may determine that the likely intent of the question is to obtain information previously viewed by the user. To classify a request as a history seeking question, history query classification module 308 may determine whether the question includes one or more phrases from a list of phrases that are associated with history seeking questions. The list of terms may include, for example, "I'm looking for," "I read," "I saw," "I viewed," "I heard," or "I remember."

In some implementations, history query classification module 308 may determine whether one or more phrases in the question are an exact match of one or more terms in the list of phrases associated with history seeking questions. For example, assume that the list of phrases includes the term "I saw," and that the question also includes the term "I saw."

In this example, history query classification module 308 may classify the question as a history seeking question based on identifying that the question includes a phrase that is an exact match of a phrase from the list of phrases that are associated with history seeking questions.

In some implementations, history query classification module 308 may determine whether one or more phrases in the question are similar, beyond a similarity threshold, to one or more phrases in the list of phrases associated with history seeking questions. When determining a similarity of the one or more phrases of the question to the one or more phrases in the list of phrases associated with history seeking questions, history query classification module 308 may use one or more of a variety of similarity detection techniques. For example, history query classification module 308 may determine an edit distance, a hamming distance, a semantic similarity, and/or may use any other technique for determining a similarity of the one or more phrases of the question to the one or more phrases in the list of phrases associated with history seeking questions.

For example, assume that the list of phrases includes the phrase "I read," and that the question includes the term "that I read about." In some such implementations, history query classification module 308 may classify the question as a history seeking question based on identifying that the question includes a term that is similar to a term from the list of phrases that are associated with history seeking questions, even though the term is not an exact match of a term from the list of phrases that are associated with history seeking questions.

While some examples of how history query classification module 308 may determine whether a question is classified as a history seeking question are described above, history query classification module 308 may use any technique to determine whether a question is classified as a history seeking question. For example, history query classification module 308 may receive information that identifies a question is classified as a history seeking questions from, e.g., one or more devices that analyze logs of questions and/or answers provided in response to questions to identify history seeking questions. As another example, history query classification module 308 may use a semantic analysis technique to determine whether a question is classified as a history seeking question.

History query classification module 308 may output an indication of whether a particular question is classified as a history seeking question to tokenizer module 310. Additionally, or alternatively, history query classification module 308 may output information regarding whether questions are classified as history seeking questions to one or more devices that store logs.

Tokenizer module 310 may receive questions, such as questions that were classified as history seeking questions, and extract n-grams from the received questions. For example, assume that tokenizer module 310 receives the history seeking question "I'm looking for a turkey recipe that I read about on my phone?" Further assume that tokenizer module 310 extracts tri-grams from received questions. In this example, tokenizer module 310 may extract the following n-grams: "I'm looking for," "a turkey recipe," "that I read," and "on my phone."

In some implementations, tokenizer module 310 may exclude insignificant terms, such as stop words—e.g., "and," "or," "the," "of," "is," "was," and "were"—when extracting n-grams from questions. In some implementations, tokenizer module 310 may extract n-grams with varying values of N from a particular question. In some implementations, when extracting n-grams, tokenizer module 310 may identify stems of words, and replace words that are based on the stems of the words with the stems of the words.

In some implementations, tokenizer module 310 may exclude phrases associated with history seeking questions when extracting n-grams from a particular question. For example, assume that the phrases "I'm looking for" and "that I read" are associated with history seeking questions. In some such implementations, and referring to the above example question, tokenizer module 310 may extract the n-grams "a turkey recipe," and "on my phone."

Filter identification module 312 may receive n-grams extracted from a question, e.g., from tokenizer module 310, and may identify, based on the n-grams, one or more filters associated with the question. A filter as described herein refers to a search criterion that may be applied to a query. Filters may include, for example: (i) a topic (e.g., "turkey recipes"); (ii) a date and/or time (e.g., "last week"); (iii) a source (e.g., "WhiteHouse.gov"); (iv) a device of the user (e.g., mobile device, desktop, or tablet); (v) a sender of the information (e.g., "from grandma"); and/or (vi) a location where the information was accessed (e.g., "at home," "at work"). In order to identify a filter associated with a question, filter identification module 312 may compare n-grams, extracted from the question, to information that associates n-grams with filters. Such information may be received from, for example, filter repository 314. Continuing with the above example question, assume that filter identification module 312 receives "a turkey recipe," and "on my phone." Further assume that filter repository 314 includes information indicating that the n-gram "a turkey recipe" is associated with a topic filter "turkey recipe," and that the n-gram "on my phone" is associated with a device filter identifying the user's device (e.g., "Device 1"). Filter identification module 312 may then determine that the question is associated with a topic filter "turkey recipe," and a device filter "Device 1."

In some implementations, filter identification module 312 may determine whether one or more n-grams extracted from a question are an exact match of one or more n-grams included in information associating n-grams with filters. In some implementations, filter identification module 312 may determine whether one or more n-grams extracted from a question are similar, beyond a similarity threshold, to one or more n-grams included in information associating n-grams with filters. Some examples of techniques that filter identification module 312 may use in identifying similar n-grams are described above with respect to history query classification module 308.

Filter identification module 312 may output information associating the question with the particular filter to one or more locations. For example, filter identification module 312 may output the information to query generation module 316 and/or to one or more components that store logs regarding filters associated with questions, and/or to any other component.

In some instances, filter identification module 312 may identify that a particular question is not associated with a particular filter. For example, filter identification module 312 may fail to identify any n-grams, extracted from the particular question, that are identical or similar to n-grams that are associated with filters. In some implementations, when this occurs, the filter identification module 312 may output information indicating that the search should retrieve all information previously accessed by the user (e.g., the user's complete browser history). Alternatively or in addition, filter identification module 312 may output information indicating that the question is not associated with a filter.

In some situations, a particular question may be associated with multiple filters. In some implementations, filter identification module 312 may output information that indicates that the question is associated with the multiple filters. In some implementations, filter identification module 312 may select fewer than all of the multiple filters—e.g., one filter—to associate with the question, based on any criteria. For example, filter identification module 312 may compare a relevance of the filter to one or more terms of the question, and may select a most relevant filter. In some implementations, filter identification module 312 may forego selecting a filter to associate with the question. That is, in some such implementations, when a question is associated with multiple filters, filter identification module 312 may output information indicating that the question is not associated with a particular filter.

The information, outputted by filter identification module 312, may be used in a variety of ways. For example, the information outputted by filter identification module 312 may include a request to query generation module 316 to formulate a search query based on the filter or filters associated with a particular question. Continuing with the above example, assume that filter identification module 312 associates the filters "a turkey recipe" and "on my phone" with the question "I'm looking for a turkey recipe I read on my phone." Filter identification module 312 may output a request to query generation module 316 to generate a search based on the filters "turkey recipe" and "Device 1."

The query generation module 316 generates a formatted query 318 based on the output from the filter identification module 312. The formatted query 318 may be, for example, an SQL or GQL query. After generating the formatted query 318, the query generation module 316 transmits the query to a search cluster, e.g., search engine 140, 240 from FIGS. 1 and 2, which then performs a search as described above.

Figure 4:
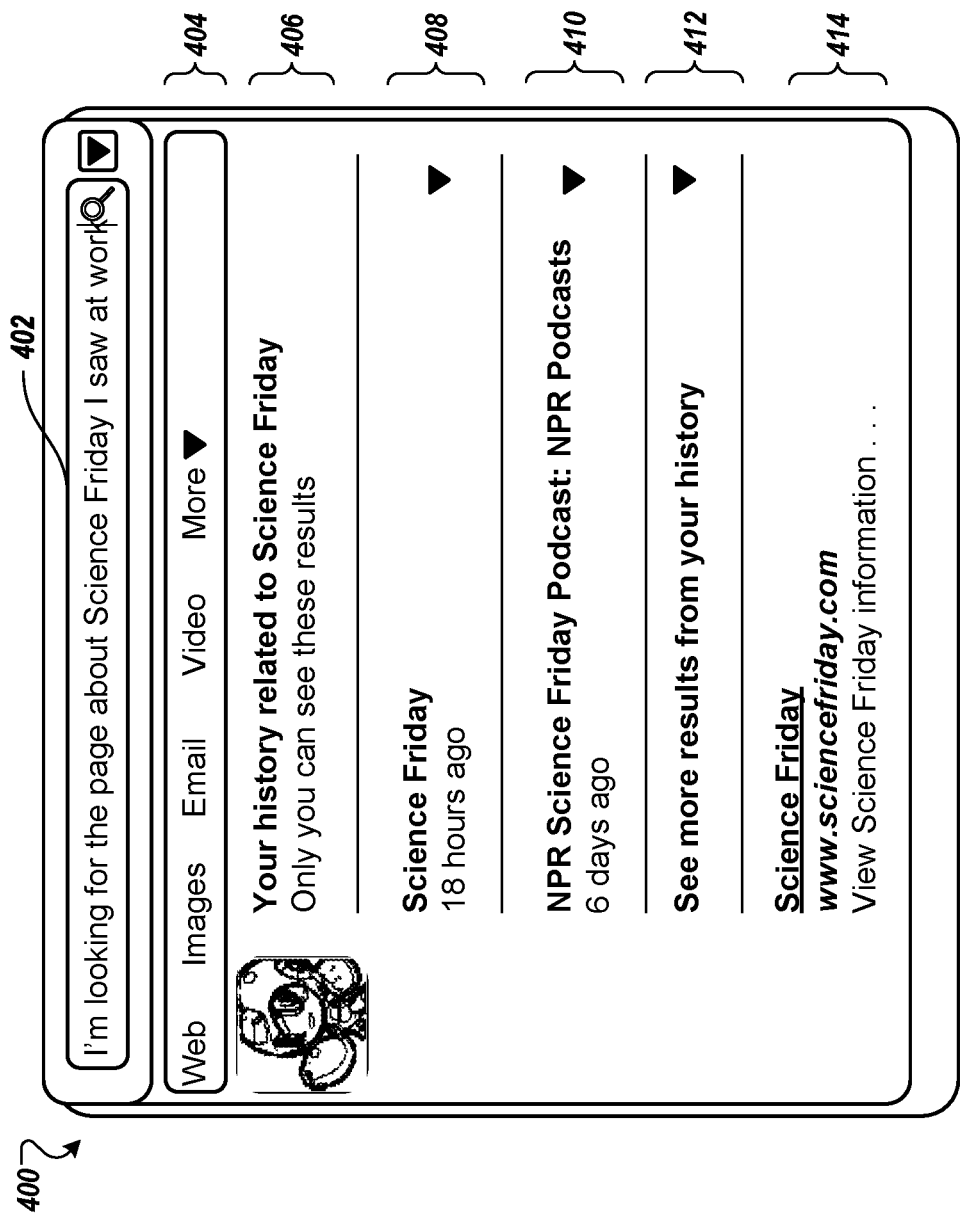
FIG. 4 is an example illustration of a set of search results page that includes search results based on information previously accessed by a user.

FIG. 4 shows a set of search results page 400 that includes search results based on information previously accessed by a user. The search results previously accessed by the user may be obtained as described above. In particular, the search results page 400 may be provided in response to a natural language query 402 (e.g., "I'm looking for the page about Science Friday I saw at work"), which represents a history seeking question with a topic filter (e.g., "Science Friday") and a location filter (e.g., "at work"). The search results page 400 includes a set of command buttons 404 that may allow the user to filter the search results, for example, to web pages, images, email, video, etc.

The search results previously accessed by the user are identified by a caption 406, e.g., "Your history related to Science Friday—only you can see these results. The results include a "Science Friday" web page 408 that was accessed 18 hours ago, and an "NPR Science Friday Podcast" web page 410 that was accessed 6 days ago. As specified by the filters, these results identify web pages relating to "Science Friday" that were accessed by the user at a location identified as "at work," which may be, for example, the user's place of business. The search results also include a link 412 that provides access to other results from the user's browser history.

In some implementations, the search results page may also include documents that are relevant to the user's query, but were not previously accessed by the user. For example, the search results page 400 includes a link to a "Science Friday" web page 414 that was not previously accessed by the user, but is still relevant to the user's query.

Figure 5:
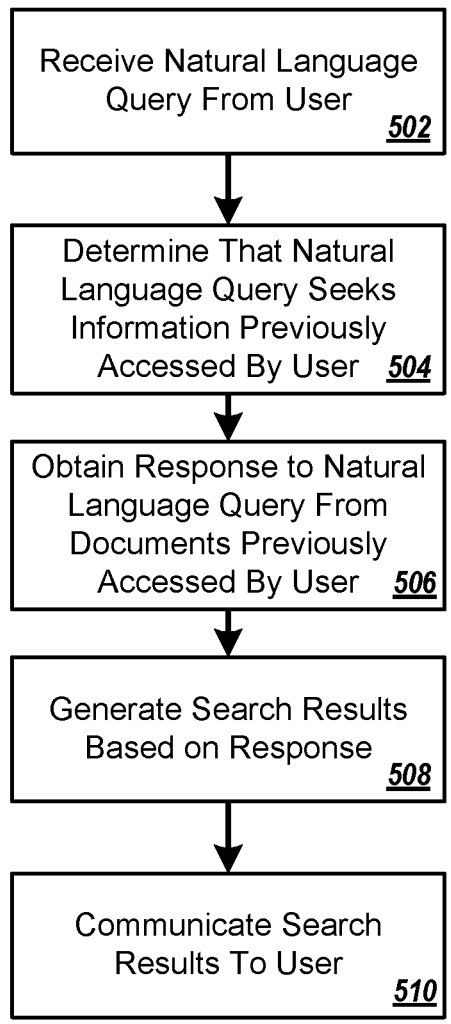
FIG. 5 is a flow chart of an example process for generating search results based on information previously accessed by a user.

FIG. 5 shows an example process 500 for generating search results based on information previously accessed by a user. For example purposes, the process 500 will be described as being performed by a server. This server may include one or more servers that perform the functions of the query processing engine 120, 220, the search engine 140, 240, and/or the scoring engine 150, 250 as described with reference to FIGS. 1-3 above.

In step 502, a server receives a natural language query from a client device associated with a user. For example, the server may receive audio speech data encoding a natural language query from a user, or the server may receive text representing the natural language query.

Next, in step 504, the server classifies the natural language query as a query that seeks information previously accessed by the user. For example, as described above with reference to FIG. 3, the server may compare portions of the natural language query, e.g., n-grams extracted from the natural language query, to one or more phrases, where the one or more phrases have been identified as seeking previously accessed information. The comparison may be based on an exact match between the portions of the natural language query and the phrases and/or a similarity between the portions of the natural language query and the phrases that exceeds a predetermined threshold. Based this comparison, the server may determine that the natural language query seeks information previously accessed by the user.

In some implementations, the server determines one or more filters based on the natural language query. The one or more filters may include, for example: (i) a topic (e.g., "turkey recipes"); (ii) a date and/or time (e.g., "last week"); (iii) a source (e.g., "WhiteHouse.gov"); (iv) a device of the user (e.g., mobile device, desktop, or tablet); (v) a sender of the information (e.g., "from grandma"); and/or (vi) a location where the information was accessed (e.g., "at home," "at work").

Then, the server obtains a response to the natural language query from one or more collections of documents in step 506. In some implementations, each document in the one or more collections of documents was previously accessed by the user. For example, the server may retrieve documents from a user's browser history and/or email account.

When the natural language query includes filters, the retrieved documents may also satisfy one or more of the filters. For example, if a filter identifies a topic (e.g., a "turkey recipe"), then the retrieved documents may include documents relating to that topic. If a filter identifies a date and/or time (e.g., last week), the retrieved documents may include documents that were previously accessed on or around the identified date and/or time. If a filter identifies a source (e.g., "WhiteHouse.gov") from which the documents were accessed, the retrieved documents may include documents that were previously accessed from that source. If a filter identifies a user device (e.g., a mobile phone) that was previously used to access information based on the natural language query, the retrieved documents may include documents that were previously accessed from that user device. If a filter identifies a sender of the information (e.g., "from grandma"), the retrieved documents may include documents that were sent from the identified sender. If a filter identifies a location (e.g., at work) from which the information was accessed, the retrieved documents may include documents that were previously accessed at that location.

In some implementations, some documents in the retrieved documents may be versions that were previously accessed by the user. For example, the retrieved documents may include versions of the documents that were cached on or around the time they were previously accessed by the user.

In step 508, the server generates search results based on the response (e.g., a set of responsive documents). When the response includes versions of documents as they were when they were accessed by the user, the search results may identify, and optionally provide a link to, the previous versions of the documents. Finally, in step 510, the server communicates the search results to the client device.

For situations in which the systems discussed herein collect personal information about users, the users may be provided with an opportunity to opt in/out of programs or features that may collect personal information, e.g., information about a user's preferences or a user's current location. In addition, certain data may be anonymized in one or more ways before it is stored or used, so that personally identifiable information is removed. For example, a user's identity may be anonymized.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for identifying and providing information in response to a user query requesting content, the method comprising:
  receiving, from a user device, a user query that includes terms that indicate a particular topic, and wherein the user has viewed, prior to providing the query to the user device, a resource that includes content of the particular topic;
  determining, from the terms of the user query, that the user query seeks information from resource that includes the content of the particular topic;
  determining, by one or more processors, a resource set comprising one or more resources that satisfy the content requested by the user query;
  determining, by the one or more processors, that the user previously accessed, before providing the user query, a particular resource that includes content for the particular topic;
  determining, by the one or more processors and based on determining that the user previously accessed, before providing the user query, the particular resource that includes content for the particular topic, a resource subset of the resource set, the resource subset comprising one or more resources that the user has previously accessed prior to providing the user query; and
  providing, for output as a result, information from the one or more resources that the user has previously accessed in response to the user query.

2. The computer-implemented method of claim 1, wherein
  determining that the user query seeks information previously accessed by the user comprises:
  determining that the user query seeks a resource previously accessed by the user in a previous search session between the user and a search engine.

3. The computer-implemented method of claim 1, further comprising:
  determining, from the terms of the user query, that the user query seeks one or more resources that satisfy one or more of a time criterion specifying at least a time prior to the user providing the user query, a topical criterion, and a device criterion; and
  determining a second resource subset comprising one or more resources from the resource subset that satisfy the one or more of the time criterion, the topical criterion, and the device criterion,
  wherein providing, for output as the result, the information from the one or more resources that the user has previously accessed comprises providing information from the one or more resources of the second resource subset.

4. The computer-implemented method of claim 3, wherein:

the time criterion includes a criterion specifying a particular period of time;
the topical criterion includes a criterion specifying one or more topics included in the information previously accessed by the user; and
the device criterion includes a criterion specifying one or more devices used to by the user to obtain the information previously accessed by the user.

5. The computer-implemented method of claim 1, wherein
determining that the user query seeks information previously accessed by the user comprises:
comparing one or more of the terms of the user query to one or more terms identified as corresponding to queries seeking previously accessed information; and
determining that the user query seeks information previously accessed by the user based on the comparing of the one or more of the terms of the query to the one or more terms identified as corresponding to queries seeking previously accessed information.

6. The computer-implemented method of claim 1, wherein the user query is a natural language query.

7. A non-transitory computer-readable storage media comprising instructions, which, when executed by one or more computing devices, cause the one or more computing devices to perform operations comprising:
receiving, from a user device, a user query that includes terms that indicate a particular topic, and wherein the user has viewed, prior to providing the query to the user device, a resource that includes content of the particular topic;
determining, from the terms of the user query, that the user query seeks information from resource that includes the content of the particular topic;
determining, by one or more processors, a resource set comprising one or more resources that satisfy the content requested by the user query;
determining, by the one or more processors, that the user previously accessed, before providing the user query, a particular resource that includes content for the particular topic;
determining, by the one or more processors and based on determining that the user previously accessed, before providing the user query, the particular resource that includes content for the particular topic, a resource subset of the resource set, the resource subset comprising one or more resources that the user has previously accessed prior to providing the user query; and
providing, for output as a result, information from the one or more resources that the user has previously accessed in response to the user query.

8. The non-transitory computer-readable storage media of claim 7, wherein determining that the user query seeks information previously accessed by the user comprises:
determining that the user query seeks a resource previously accessed by the user in a previous search session between the user and a search engine.

9. The non-transitory computer-readable storage media of claim 7, the operations further comprising:
determining, from the terms of the user query, that the user query seeks one or more resources that satisfy one or more of a time criterion specifying at least a time prior to the user providing the user query, a topical criterion, and a device criterion; and
determining a second resource subset comprising one or more resources from the resource subset that satisfy the one or more of the time criterion, the topical criterion, and the device criterion,
wherein providing, for output as the result, the information from the one or more resources that the user has previously accessed comprises providing information from the one or more resources of the second resource subset.

10. The non-transitory computer-readable storage media of claim 9, wherein:
the time criterion includes a criterion specifying a particular period of time;
the topical criterion includes a criterion specifying one or more topics included in the information previously accessed by the user; and
the device criterion includes a criterion specifying one or more devices used to by the user to obtain the information previously accessed by the user.

11. The non-transitory computer-readable storage media of claim 7, wherein determining that the user query seeks information previously accessed by the user comprises:
comparing one or more of the terms of the user query to one or more terms identified as corresponding to queries seeking previously accessed information; and
determining that the user query seeks information previously accessed by the user based on the comparing of the one or more of the terms of the query to the one or more terms identified as corresponding to queries seeking previously accessed information.

12. The non-transitory computer-readable storage media of claim 7, wherein the user query is a natural language query.

13. A system comprising:
one or more computing devices and one or more storage devices storing instructions, which when executed by the one or more computing devices, cause the one or more computing devices to perform operations comprising:
receiving, from a user device, a user query that includes terms that indicate a particular topic, and wherein the user has viewed, prior to providing the query to the user device, a resource that includes content of the particular topic;
determining, from the terms of the user query, that the user query seeks information from resource that includes the content of the particular topic;
determining, by one or more processors, a resource set comprising one or more resources that satisfy the content requested by the user query;
determining, by the one or more processors, that the user previously accessed, before providing the user query, a particular resource that includes content for the particular topic;
determining, by the one or more processors and based on determining that the user previously accessed, before providing the user query, the particular resource that includes content for the particular topic, a resource subset of the resource set, the resource subset comprising one or more resources that the user has previously accessed prior to providing the user query; and
providing, for output as a result, information from the one or more resources that the user has previously accessed in response to the user query.

14. The system of claim 13, wherein determining that the user query seeks information previously accessed by the user comprises:

determining that the user query seeks a resource previously accessed by the user in a previous search session between the user and a search engine.

15. The system of claim 13, the operations further comprising:
 determining, from the terms of the user query, that the user query seeks one or more resources that satisfy one or more of a time criterion specifying at least a time prior to the user providing the user query, a topical criterion, and a device criterion; and
 determining a second resource subset comprising one or more resources from the resource subset that satisfy the one or more of the time criterion, the topical criterion, and the device criterion,
 wherein providing, for output as the result, the information from the one or more resources that the user has previously accessed comprises providing information from the one or more resources of the second resource subset.

16. The system of claim 15, wherein:
 the time criterion includes a criterion specifying a particular period of time;
 the topical criterion includes a criterion specifying one or more topics included in the information previously accessed by the user; and
 the device criterion includes a criterion specifying one or more devices used to by the user to obtain the information previously accessed by the user.

17. The system of claim 13, wherein determining that the user query seeks information previously accessed by the user comprises:
 comparing one or more of the terms of the user query to one or more terms identified as corresponding to queries seeking previously accessed information; and
 determining that the user query seeks information previously accessed by the user based on the comparing of the one or more of the terms of the query to the one or more terms identified as corresponding to queries seeking previously accessed information.

18. The system of claim 13, wherein the user query is a natural language query.

* * * * *